(12) United States Patent
Schenk et al.

(10) Patent No.: US 11,038,851 B2
(45) Date of Patent: *Jun. 15, 2021

(54) TOKENIZING NETWORK APPLIANCE AND METHOD

(71) Applicant: DATEX INC., Mississauga (CA)

(72) Inventors: Derek Schenk, Acton (CA); Edward Leavens, North York (CA); Marc Carrafiello, Oakville (CA); Abe Schwartz, Markham (CA)

(73) Assignee: DATEX INC.

( * ) Notice: Subject to any disclaimer, the term of this patent is extended or adjusted under 35 U.S.C. 154(b) by 0 days.

This patent is subject to a terminal disclaimer.

(21) Appl. No.: 16/428,194

(22) Filed: May 31, 2019

(65) Prior Publication Data

US 2020/0059453 A1 Feb. 20, 2020

Related U.S. Application Data

(63) Continuation of application No. 15/315,993, filed as application No. PCT/CA2015/050513 on Jun. 2, 2015, now Pat. No. 10,326,739.

(Continued)

(51) Int. Cl.
*H04L 29/06* (2006.01)
*H04L 12/64* (2006.01)
(Continued)

(52) U.S. Cl.
CPC ...... *H04L 63/0428* (2013.01); *G06F 21/6254* (2013.01); *G06Q 20/401* (2013.01);
(Continued)

(58) Field of Classification Search
CPC .................................................. H04L 63/0428
See application file for complete search history.

(56) References Cited

U.S. PATENT DOCUMENTS 5,384,782 A * 1/1995 Elms ..................... H03M 13/27
370/529
5,850,446 A 12/1998 Berger et al.
(Continued)

FOREIGN PATENT DOCUMENTS

WO 2011146742 11/2011

OTHER PUBLICATIONS

European Patent Office, Office Communication, dated Dec. 9, 2019, in relation to European Patent Application No. 15803229.2.
(Continued)

*Primary Examiner* — Shawnchoy Rahman

(57) ABSTRACT

An example security device receives a plurality of data units carrying traffic in a message encoded in accordance with an application layer protocol for a server. The message comprises payload. The security device analyzes the plurality of data units to identify the application layer protocol; selects a data extraction algorithm in dependence on the identified application layer protocol; extracts selected data from the payload, in accordance with one or more tokenizing rules; and forwards selected data to a token encoder, to allow the token encoder to store selected data and return at least one token used to identify the selected data. The device receives from the token encoder, at least one token and replaces the selecting data in the payload with the at least one token to form modified payload and forming and forwards a modified message comprising the payload data, in place of the message, thereby securing the original message.

12 Claims, 17 Drawing Sheets

Related U.S. Application Data

(60) Provisional application No. 62/006,445, filed on Jun. 2, 2014.

(51) Int. Cl.
  *G06F 21/62* (2013.01)
  *G06Q 20/40* (2012.01)
  *G07F 7/10* (2006.01)
  *H04L 12/58* (2006.01)

(52) U.S. Cl.
  CPC ........ *G07F 7/1008* (2013.01); *H04L 12/6418* (2013.01); *H04L 51/14* (2013.01); *H04L 63/20* (2013.01)

(56) References Cited

U.S. PATENT DOCUMENTS

| | | | |
|---|---|---|---|
| 7,209,458 B2 * | 4/2007 | Ahvonen | H04L 65/80 370/328 |
| 7,336,682 B2 | 2/2008 | Singh | |
| 8,458,487 B1 | 6/2013 | Palgon et al. | |
| 8,572,710 B2 * | 10/2013 | Narayanan | G06F 21/335 709/225 |
| 2006/0167975 A1 | 7/2006 | Chan et al. | |
| 2008/0165970 A1 | 7/2008 | Chung et al. | |
| 2008/0285495 A1 | 11/2008 | Wentink et al. | |
| 2009/0164985 A1 * | 6/2009 | Balko | G06Q 10/0633 717/162 |
| 2009/0296685 A1 | 12/2009 | O'Shea et al. | |
| 2009/0300327 A1 | 12/2009 | Omtzigt | |
| 2011/0154466 A1 | 6/2011 | Harper et al. | |
| 2014/0032733 A1 | 1/2014 | Barton et al. | |

OTHER PUBLICATIONS

International Search Report and Written Opinion dated Oct. 8, 2015, in relation to PCT Application No. PCT/CA2015/050513, filed on Jun. 2, 2015.

Jana and Bandyopadhyay, "Management of Security and Privacy Issues of Application Development in Mobile Cloud Environment: A Survey", IEEE International Conference on Recent Advances and Innovations in Engineering (ICRAIE), May 9, 2014-May 11, 2014, pp. 1-6.

Nxumalo et al., "Towards privacy with tokenization as a service", Adaptive Science & Technology (ICAST), 2014 IEEE 6th International Conference, Oct. 29, 2014-Oct. 31, 2014, pp. 1-6.

Extended European Search Report dated Nov. 7, 2017, in relation to European Patent Application No. 15803229.2, filed on Jun. 2, 2015.

* cited by examiner

```
connector http {
  listen {
    host 'secure.server.local'
    ip '10.1.1.1'
    port 443
    enableSSL true
    certificate '/path'
  }
}                                                                    } Connector Definition 220 provider {
  balance(type: roundrobin)
  affinity(type: 'session,ip_hash', force: true) {
    sessionId 'ASPSESSIONID'
  }
  server(host: '20.1.1.100:443', name: 'server1', weight: 1, from: '20.1.1.1')
  server(host: '20.1.1.200:443', name: 'server2', weight: 2, from: '20.1.1.1')
}                                                                    } Server Provider Definition 221
```

FIG. 4

```
//Handle the request from the service consumer
request{
    transform{
        //Modify the request to add the X-Forwarded-* Headers
        add modifyHTTPHeaders {
            addHeader('X-Forwarded-For', '${request.remoteAddress}')
            addHeader('X-Forwarded-Port', '${request.removePort}')
            addHeader('X-Forwarded-Proto', '${request.protcol}')
            addHeader('X-Secured-By', '${this.nodeName}')
        }
        //Rewrite cookies so they match what the server expects
        add rewriteCookie{
            rewrite('${this.host}', 'someother.net')
            rewrite('another.name', 'another.value')
        }
    }
//Process the request
process{
    //Add a tokenize step
    add contentTokenize{
        //Only when processing the "AccountInfo.html" page
        when urlMatch('.*accountinfo.html.*')

//Extract variables and values from the parameters
        variable('CoNo', param('MyCoNo'))
        variable('CustNo', param('MyCustNo'))
        variable('CustName', param('CustName'))
        variable('ExpiryDate', param('ExpiryDate'))

//Secure the field "CreditCardNo"
        secure field('CreditCardNo'){
        ...
```

Transformation Rules 121

Tokenizing Rules 123a

...
    //Type of data is a payment card number
    type pan

//Apply validation, the return is what will be placed in the field if the validation fails
    validate(type: 'pan-luhn', return: 'SSSS 1111 2222 3333')
    validate(type: 'pan-iin', return: '0000 1111 2222 3333')
    validate(type: 'pan-preauth', return: '9999 0000 1111 2222')

//If validations pass, then generate the following values.
    generate(type:'pan-token', name:'token', text:'SS## #### #### ###L')
    generate(type:'pan-mask', name:'maskedPan', text:'SSXX XXXX XXXX SSSS')

//Assign the value "token" that was generated to this field, the rest or available as variables
    assign '${token}'
}

//If the validations pass then the storeVaultData call is made
storeVaultData('${CoNo}_${CustNo}', 'PAN') {
    //set the status to pending
    status 'pending'

//and define the fields
    field(type:'secure', name:'real',          value: '${CreditCardNo}', index:'hash')
    field(type:'store',  name:'token',         value:'${token}')
    field(type:'store',  name:'masked',        value:'${maskedPan}')
    field(type:'store',  name:'companyId',     value:'${CoNo}')
    field(type:'store',  name:'customerId',    value: '${CustNo}', index: 'value')
    field(type:'store',  name:'cardholderName',value:'${CustName}', index:'value')
    field(type:'store',  name:'expiryDate',    value:'${ExpiryDate}')
}
```

Tokenizing Rules 123a

FIG. 5B

```
//Handle processing of the Response from the service provider
response{
  transform{
    //Rewrite the URL's, this handles all content, includes HTML, javascript, etc
    add rewriteURL{
      rewrite('someother.net','${this.host}')
    }

//Rewrite any cookies to correct the host
    add rewriteCookie{
      rewrite('someother.net','${this.host}')
      rewrite('another.value','another.name')
    }

//Remove some HTTP headers to secure the information
    add modifyHTTPHeaders{
      removeHeader('x-machine','server','x-aspnet-version','x-powered-by')
    }

//Minify the HTML content to improve performance
    add minifyHTML{
      when contentType(".*html.*")
      minifyEmbeddedJavascript true
      minifyEmbeddedStyles true
    }

//Minify the javascript to improve performance
    add minifyJavascript{
      when contentType(".*javascript.*")
    }

//Minify the stylesheet to improve performace
    add minifyCSS{
      when contentType(".*stylesheet.*")
    }

//Compress the content
    add compression {
    }
  ...
}
```

Transformation Rules 121

//Process the response data that is returned
process{
    ...

//If a content tokenize action is active, and no errors occurred, then save the vaulted data
    //this persists the data previously added to the vault in request processing
    add saveVaultData{
        when contentTokenizeActive
        when responseCode('200')
        when urlNotMatch(url:'.*error.*')
        when responseElement('#ErrorDiv', action:'does-not-exist')
    }

//Detokenize
    add contentDetokenize{
        //Only when processing the "AccountInfo.html" page
        when urlMatch('.*accountinfo.html.*')

//Extract variables and values from the response html
        variable('CoNo', field('#MyCoNo'))
        variable('CustNo', field('#MyCustNo'))

//Load and show the 'masked' value in the field
        update field(CreditCardNo'){
            vaultLookup(name:'masked', lookupId: '${CoNo}_${CustNo}', lookupType:'PAN')
        }
    }
}
```

De-tokenizing Rules 123b

FIG. 6B

TOKENIZING NETWORK APPLIANCE AND METHOD

CROSS-REFERENCE TO RELATED APPLICATIONS

The present application is a continuation of U.S. Ser. No. 15/315,993 filed Dec. 2, 2016 which is a National Phase filing of International Application No. PCT/CA2015/050513 filed Jun. 2, 2015, which claims priority from U.S. Provisional Patent Application No. 62/006,445, filed Jun. 2, 2014, the contents of which are hereby incorporated by reference.

TECHNICAL FIELD

This relates to data security and more particularly to computer software and hardware used to secure network application data, by way of tokenization.

BACKGROUND

Data security has become critical in modern computing and networking. Two known way of securing data are data encryption and tokenization.

Encryption aims to secure data in its place, and tokenization removes the data from the system and replaces it with an alternate (token) value.

Off the shelf encryption and tokenization solutions are often not sufficient for use by many organizations.

Implementing custom encryption or tokenization, however, often requires significant changes to existing computer systems and software. These changes require development, testing, planning and implementation, which can be expensive and can introduce software bugs. As a result of this risk and cost, many organizations choose not to implement.

Accordingly, methods, software and devices for securing computer data are desirable.

SUMMARY

Network security devices, methods and software are disclosed.

An example security device receives a plurality of data units carrying traffic in a message encoded in accordance with an application layer protocol for a server. The message comprises payload. The security device analyzes the plurality of data units to identify the application layer protocol; selects a data extraction algorithm in dependence on the identified application layer protocol; extracts selected data from the payload, in accordance with one or more tokenizing rules; and forwards selected data to a token encoder, to allow the token encoder to store selected data and return at least one token used to identify the selected data. The device receives from the token encoder, at least one token and replaces the selecting data in the payload with the at least one token to form modified payload and forming and forwards a modified message comprising the payload data, in place of the message, thereby securing the original message.

BRIEF DESCRIPTION OF THE DRAWINGS

In the figures which illustrate example embodiments,

FIG. 4 is a listing of pseudo code representing used in protocol analysis/identification at a security device of FIG. 1;

FIGS. 5A-5B are pseudo code illustrating example transformation and tokenization rules in processing a network request between devices of FIG. 1;

FIGS. 6A-6B are pseudo code illustrating example transformation and de-tokenization rules in processing a network response between devices of FIG. 1;

DETAILED DESCRIPTION

Figure 1:
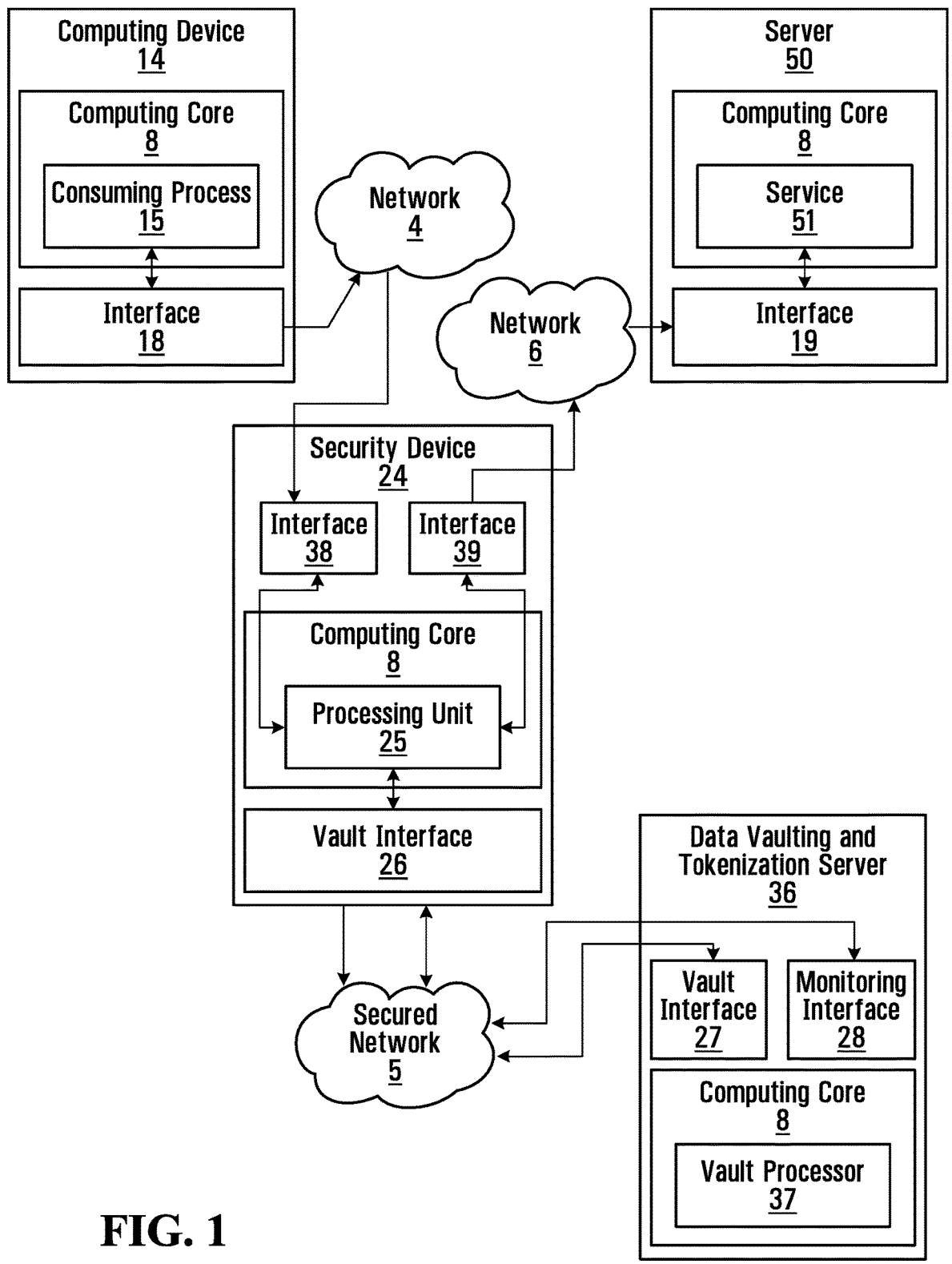
FIG. 1 is a schematic block diagram of a computing environment, exemplary of an embodiment of the present invention.

FIG. 1 is a schematic block diagram of a computing environment 10, exemplary of an embodiment of the present invention. Computing environment 10 includes one or more end-user computing devices 14, one or more of servers 50, and one or more security devices 24, exemplary of embodiments of the present invention. Environment 10 further includes at least one data vaulting and tokenization server 36.

Computing device 14 is coupled to security device 24 by way of computer network 4. Security device 24 is coupled to server 50 by way of computer network 6. Security device 24 is further coupled to data vaulting and tokenization server 36 by way of computer network 5.

Network 4 used to connect computing device 14 to security device 24 may or may not be the same as network 6, which may or may not be the same as network 5, which is used to connect the security device 24 to the server 50. Security device 24 and data vaulting and tokenization server 36 are coupled by way of network 5. Network 5 may or may not be the same network as network 4 and/or network 6. Each of networks 4, 5 and 6 may include one or more wireless and/or wired communication systems; one or more private intranet systems and/or public internet system; and/or one or more local area networks (LAN) and/or wide area networks (WAN). Optionally, VPN tunnels or other secured connections may be established across networks 4, 5 and 6.

Security device 24 may be embodied in one or more devices providing one or more network addresses that may or may not be load balanced providing scalability and failover. Multiple such devices (not specifically illustrated)—like security device 24—may be placed at multiple geographic locations. Security device 24, data vaulting and tokenization server 36, computing device 14 and server 50 can all be located in a single geographic location, all in different locations, or any combination of locations. As will become apparent, typically, data vaulting and tokenization server 36 is geographically removed from server 50, so that sensitive data need not be stored at server 50.

Each of security devices 24, data vaulting and tokenization server 36, computing device 14 and server 50 may be a conventional computing device (e.g. personal computer, computer server; embedded device; or the like). Possibly, one or more of these could be a cable box, satellite receiver, television, home entertainment system, or a portable computing device—cell phone, smart phone, tablet, gaming system, laptop, and/or a fixed computing device other home or office computing equipment or any other device that contains a computing core).

Each computing device includes a computing core 8, persistent computer readable memory—including a suitable combination of random access memory, read-only memory, and the like—and one or more network interfaces 18, 19, 26, 27, 28, 38 and 39 interconnecting devices 14, 24, 50 and data vaulting and tokenization server 36 to networks 4, 5 and 6. Each of interfaces 18, 19, 26, 27, 28, 38 and 39 includes software and/or hardware to support one or more communication links via the networks 4, 5 and 6 and/or directly. For example, interfaces 19 support a communication link (wired, wireless, direct, via LAN, via the network 4, etc) between security device 24 and server 50. As another example security device 24 interface 18 supports a plurality of communication links via the network 4 between service consumer 14 and security device 24.

Computing device 14, may store suitable software in its memory for execution—to create process 15—and to use interface 18 to initiate a network connection to security device 24. Computing device 14 may be a conventional end-user computing device hosting and executing a conventional operating system and network application, such as an internet browser. Computing device 14 may for example, be a Windows based computing device, a Unix/Linux based computing device, an Apple computing device, a smart phone (e.g. Android, or iOS based), or any other suitable computing device. Computing device 14 may further host and execute a web browser, such as Safari, Firefox, Microsoft Explorer, or the like, and/or other network aware software, such as a SMTP mail client, FTP client, or the like.

Security device 24 accepts network connections from network 4 using interface 38. Interface 38 may listen for and accept connections on addresses and ports that have been pre-configured, in a conventional manner. These connections can, for example, be any internet or transport layer (e.g TCP).

As will be apparent, a network connection is established before the exchange of data. Once established the connection may be used to exchange data (in the form of protocol data units). Requests/responses are exchanged over a single or multiple connections. For example, an HTTP transmission may request a protocol unit request for a GET, followed by an HTML response where the entire transmission operates on TCP. In yet another example a syslog protocol unit is receive and transmitted to a server using UDP, where the response is simply the acknowledgement of the bytes leaving the security appliance interface.

As will be appreciated, binary data is typically provided to interface 38 in protocol data units (PDUs)—that may be compliant with one or more suitable network protocols—e.g. IP packets, over a connection. PDUs received by way of interface 38 at security device 24 are passed to processing unit 25.

Processing unit 25, in turn, may under software control decode the PDUs/binary data, apply any desired transformation, and execute any security processing to remove sensitive data from the PDUs and replaced it with substitute data or tokens, as described below.

Data vaulting and tokenization server 36, also includes a standard computing core 8—including processor and persistent storage memory—and runs vault processing software 37, which provides data tokenization and data vaulting capability. Vault processing software 37 may include a collection of interfaces to allow the generation of data tokens, and the storage of sensitive data and additional data. As well, vault processing software 37 may be in communication with a data store that may, for example, take the form of a database engine, and suitable database, to allow for storage of tokens, sensitive data and additional data. Other suitable data stores will be known to those of ordinary skill. The data store allows for the storage and retrieval of data provided to data vaulting and tokenization server 36. Stored data may be encrypted. The data store may be local to tokenization server 36 or physically and/or geographically remote therefrom.

In particular, data vaulting and tokenization server 36 may receive sensitive data and additional data (including metadata) and by way of interface 27 and store it in association with an arbitrary token identifying the sensitive data and additional data. The token may generated by data vaulting and tokenization server 36 and provided to the provider of the data. Conversely, stored data may be retrieved by providing a token to data vaulting and tokenization server 36 in order to retrieve the stored data associated with the provided token. Vault processing software 37 provides persistent storage of the tokens, the metadata and the secure values, so that the security device 24, as well as any other device capable and authorized to use data vaulting and tokenization server 36 can access tokens, secure data and metadata.

For example, data vaulting and tokenization server 36 has the ability to generate token values using a named pattern such as payment card (e.g. credit or debit card, loyalty card, or the like), or by using a pattern or string representing the format that the token should follow. For example, data vaulting and tokenization server 36 may accept a request for a unique token given a format string "45##-####-###L-1234" where the returned token will be generated to start with "45", and with "1234", the "#" characters will be replaced with a numeric value, and the "L" will be a value generated such that the new token will pass a Luhn check, and the given returned value is unique across all stored values in data vaulting and tokenization server 36.

Data vaulting and tokenization server 36, in addition to storing the original secured value, has the capability to store additional data in its data store in association with the token, and sensitive data. The additional data may include any value including but not limited to strings, dates, numbers, and masked presentations of the sensitive data. For example, if data vaulting and tokenization server 36 is used to store credit card data, and generated tokens follows a payment card format, then in addition to the original secure credit card number, a masked (or obfuscated) representation of the original card number may be stored where all but the last 4 digits have been replaced with an 'X'. The additional data may be generated remotely from data vaulting and tokenization server 36, and provided thereto.

Figure 2:
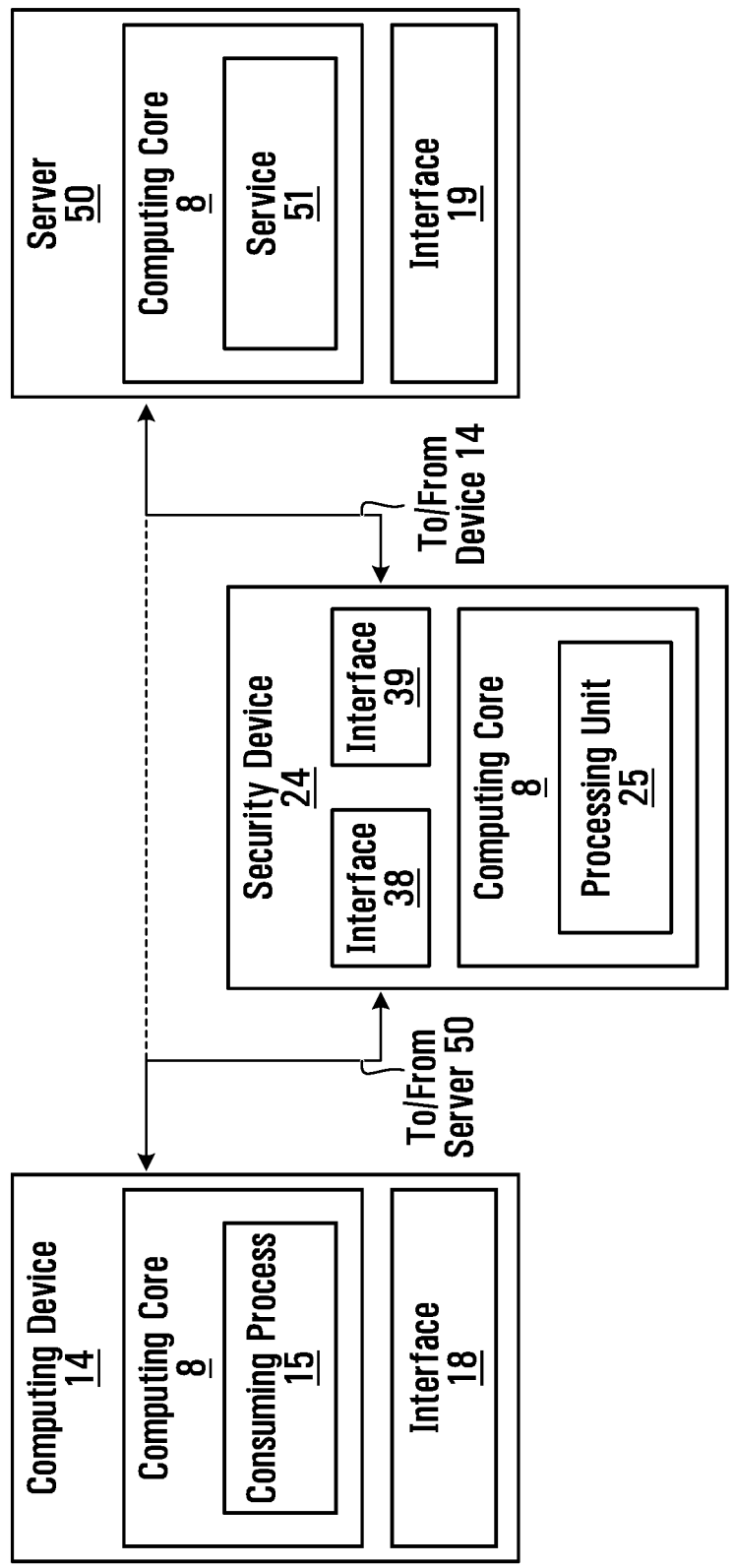
FIG. 2 is a schematic block diagram of a portion of the computing environment of FIG. 1, depicting message flow between an end user and a service provider.

FIG. 2 depicts the interposition of security device 24 between computing device 14 and server 50. As illustrated, security device 24 is logically placed between computing device 14 and server 50, so that connections with server 50 pass through security device 24. Security device 24 may, for example, be configured to be transparent to both computing device 14 and server 50, or can be deployed by altering computing device 14 to use a different address or locator for server 50. For example, security device 24 can be configured with a DNS name that was previously assigned to server 50, so that computing device 14 will contact security device 24 instead of the server 50 without having been altered or reconfigured. Alternatively, security device 24 may form part of a router or proxy on network 4, used by computing device 14 to communicate over network 4.

In any event, security device 24 operates in such a way that connections from computing device 14 to server 50 pass transparently through security device 24 to server 50, allowing requests and responses to be modified at security device 24, while allowing connections between computing device 14 and server 50 to appear as direct connections to both computing device 14 and server 50.

For example, security device 24 can be configured to "spoof" the IP address of computing device 14 that initiated the connection, so that access logs and security functions on server 50 will continue to function as before security device 24 was installed.

Figure 3:
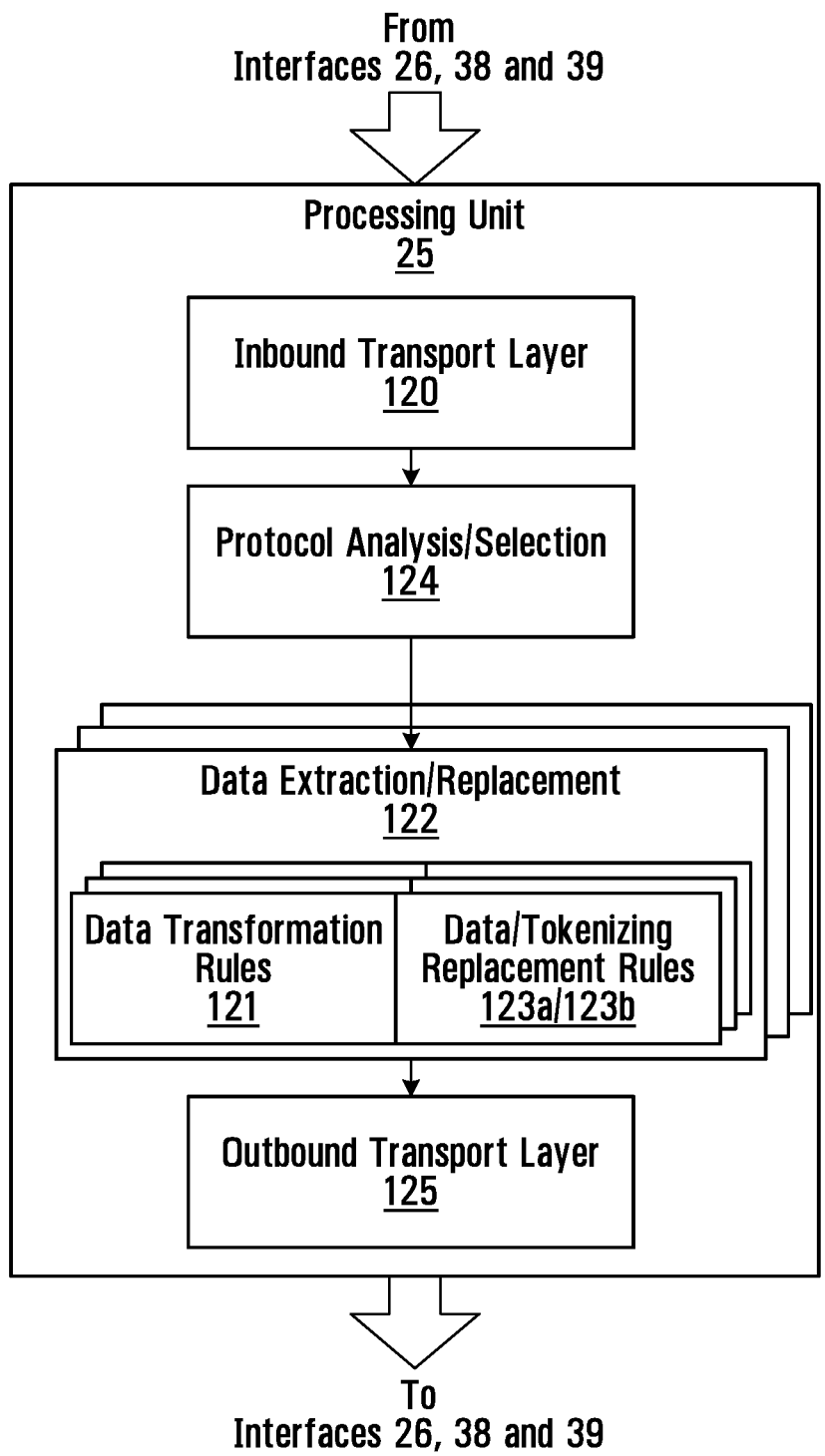
FIG. 3 is a block diagram of software units at a security device of FIG. 1.

FIG. 3 shows a functional block diagram of a processing unit 25 as provided by the security device 24, executing exemplary software. As illustrated, processing unit 25 executes one or more network transport layer component 120, 125 (e.g. protocol stacks); a protocol analysis components 124; and one or more data extraction/replacement handlers 122. Each data extraction/replacement handler 122 may further include one or more data transformation rules 121 and one or more data tokenizing rules 123*a* and data de-tokenizing rules 123*b*.

Processing unit 25 operates on connections through security device 24. Each connection and requests and responses carried over the connection may be individually processed as described herein. Processing unit 25 may support any number of concurrent connections to provide computing device 14 secured access to one more servers—such as example server 50. For example, a connection may provide computing device 14 access to a billing web site, where multiple servers (not specifically illustrated)—like server 50—exist to provide this billing web site, and security device 24 may, for this defined connection, distributing computing device 14 connections across the available service providers 50 using load balancing.

As will be described in greater detail below, processing unit 25 of security device 24 under software control analyzes data units received from computing device 24, to identify the application layer protocol used by in a connection to server 50 by an application at computing device 24. The application layer protocol may for example, be the HTTP(s), XML, SMTP, Telnet, FTP, POP, SPDY, WebSockets, IMAP, NNTP, IRC Telnet, SSH, FTP, SFTP, LDAP, LDAPS, NFS, SMB, MSSQL, MYSQL or the like. Other application layer protocols will be known to those of ordinary skill.

Security device 24 supports a plurality of transport layers through transport layer components 120 and 125. Each transport layer component 120, 125 is a hardware and/or software components that accepts network connections to/from other network interconnected devices—for example from interface 38 of device 14 or interface 19 of server 50, and may include a conventional protocol stack, or portion thereof. For example, a connection may be a TCP/IP connection transmitting HTML over HTTPS. Transport layer component 120 will handle the TCP/IP connection and the HTTP commands. Another connection may be a TCP/IP connection using a SQL Client/Server protocol, and transport layer component 120 will handle the TCP/IP connection (data extraction handler 122 may decode SQL Client/Server protocol details, as detailed below).

Security device 24 hosts a plurality of decoding/encoding handlers 122, with each decoding/encoding handler 122 designed for a designated application layer protocol, as identified by protocol analysis component 124. Each decoding/encoding handler 122 is capable of receiving binary data and decoding the data to allow the results can be interpreted in a meaningful way facilitating transformations, modifications, substitutions and other processing of the data, by way of data transformation rules 121, data tokenizing rules 123*a* and data de-tokenizing rules 123*b*. Decoding/encoding handler 122 may also be capable of encoding data into a binary representation so that the data can be transmitted using a transport layer component 125, different from the transport layer component 120 on which the data was received.

An example of a data extraction/replacement handler 122 is an HTML extraction/replacement handler, where this HTML handler is able to read the binary data from the transport layer component 120, interpret it as HTML and convert it into a DOM representation of the HTML page such that individual elements may be selected from the page, to allow conversion of the DOM representation back into a binary format. Yet another example of a extraction/replacement handler 122 would be a SQL decoder/encoder, where the decoder is capable of converting the binary stream into the SQL protocol objects, and then re-encode these objects back into binary format, where the protocol objects support selecting and modifying data such as field values, parameters, query text and other values.

Individual data transformation rules 121 and data tokenizing/de-tokenizing rules 123*a*/123*b* within data extraction/replacement handler 122 may further transform decoded data and tokenize (or de-tokenize) portions of the data. Security device 24 hosts a plurality of such tokenizing/de-tokenizing rules 123*a*/123*b* and data transformation rules 121—that are connection and application layer protocol specific. That is, tokenizing/de-tokenizing rules 123*a*/123*b* and data transformation rules 121 may be specific to each connection, and may be programmed by an administrator with knowledge of the connections provided by server 50. Data tokenizing/de-tokenizing rules 123*a*/123*b* and data transformation rules 121 may thus be specific to the very data that is being provided from/to server 50. For example, in the case of HTTP connections to server 50, data tokenizing/de-tokenizing rules 123*a*/123*b* and data transformation rules 121 may be specific to each HTML or similar page provided by server 50.

Each of data tokenizing/de-tokenizing rules 123*a*/123*b* and data transformation rules 121 is configured with a plurality of conditions that define when the respective rule should be applied. These conditions may use any details of the results of the decoded data, the transport layer, connection related details, or any other programmatically defined condition capable of being evaluated at processor 25. A transformation rule 121 will, when invoked, alter payload data, returning altered payload data, allowing other transformation rules 121 to be applied, as well as allowing the result to be passed to tokenizing/de-tokenizing rule 123*a*/123*b*.

An example of a transformation rule 121 modifies HTTP headers for a service provider request to add information about security device 24, as well as to remove headers from a server 50 response to, for example, improve the security of a service by removing identifying information about the service provider operating server 50. Yet another example of a transformation rule 121 is a compression algorithm, configured to be executed if computing device 14 indicates in the request headers that compression can be accepted. The compression algorithm may compress the response data from the server 50 resulting in a smaller and therefore faster transmission.

Security device 24 similarly supports a plurality of tokenizing/de-tokenizing rules 123a/123b, where each tokenizing/de-tokenizing rule 123a/123b is capable of processing the result returned from a data transformation rule or tokenizing rule to make a modification to the structure and or content of payload data before it is transmitted to server 50 or computing device 14. Again, each tokenizing/de-tokenizing rule 123a/123b may be configured with a plurality of conditions that define when the rule is to be applied, where these conditions may use any details of the payload data, the transport layer, connection related details, or any other programmatically defined condition that may be evaluated.

An example of a transformation tokenizing rule 123a is an HTML tokenizing rule, which when invoked will locate an HTML element containing data of certain type—such as, for example, a secured element in the form of a credit card number inside of an HTML document—using a locator such as the ID, and will replace the element with a token substitute value, to form a modified document that no longer contains the secure data. Yet another example of a tokenizing rule 123a is a SQL tabular data stream processor, which when invoked will replace a specific field in a resulting data stream, for each row of data in the stream, altering the value from a token substitute value back to the original secured value, where the expected value of the field is a social insurance number, and the database has returned a result set containing a field for social insurance number that currently contains a substitute token.

Example pseudo code depicting protocol analysis/selection 124 is illustrated in FIG. 4. Example, pseudo code for transformation rules 121 and tokenizing/de-tokenizing rule 123a/123b is depicted in FIGS. 5 and 6.

Figure 7:
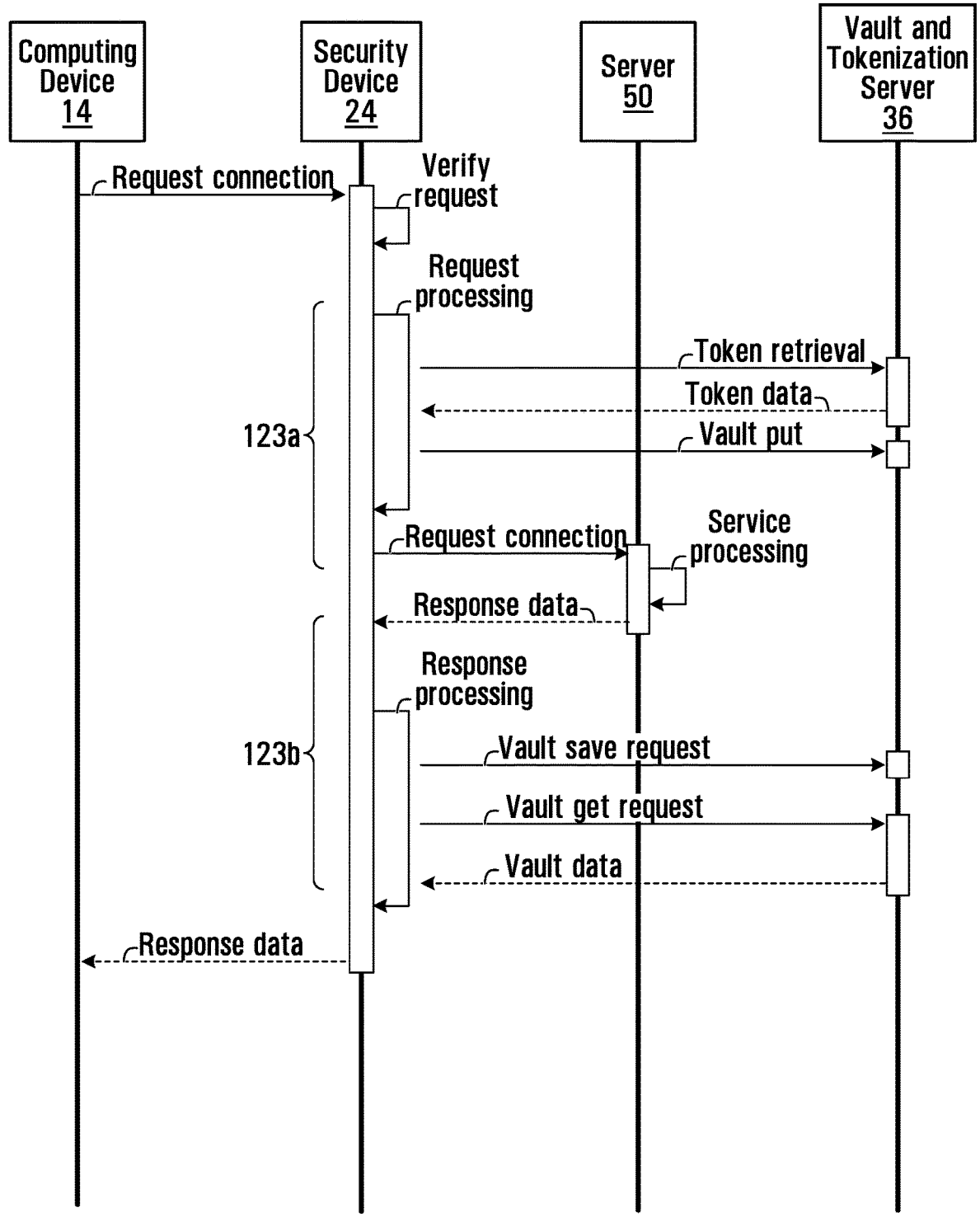
FIG. 7 is a flow diagram illustrating example connections from across computing environment.

Operation of security device 24 and interaction with device 14, data vaulting and tokenization server 36 and server 50 are detailed in the sequence flow of FIG. 7, and flow charts in FIGS. 8-14.

Computing device 14 initiates a connection request to security device 24. The connection request and data is first verified by the transport layer component 120 to ensure that the request is valid both from contents, as well as using a configured set of validation rules that may include other technical or business restrictions such as IP address, or computing device 14 restrictions. For example, security device 24 can be configured to only accept connection from a specific IP address.

Once the connection has been verified processing unit 25 may allocate a session. The connection is now established by way of security device 24 (over interface 38), that intercepts PDUs to be transmit over the connection. Typically connections transport one or more requests and responses. A connection may remain open until closed, or time-out. Context data may be stored for the duration of the connection, and can include data and state information related to the connection, data or state.

The request will then be processed, including request decoding, transformation and tokenization. This may or may not include token retrieval calls to vaulting and tokenization server 36, as detailed below. Processing of the request may also involve storing data (e.g. context information) in the vaulting and tokenization device 36.

Figure 8:
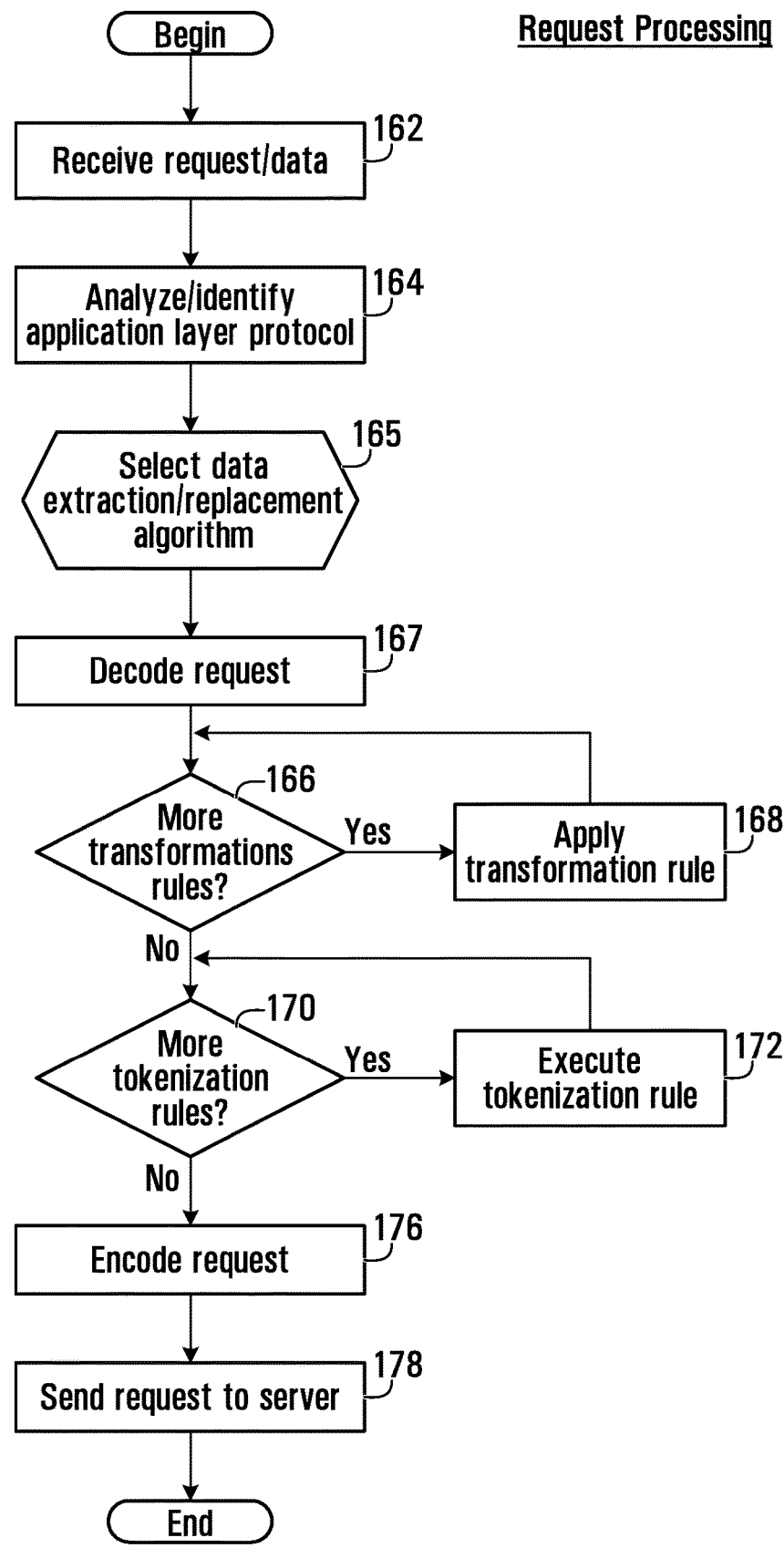
FIG. 8 is a flow chart of the handling of a request at the security device of FIG. 1.

As illustrated in FIG. 7, an end user computing device 14 initiates the network connection with server 50 by providing a request which is processed at server 24 in blocks S161-S182, depicted in FIG. 8.

As illustrated, the request for a connection and associated PDUs is received in block S162. In block S164 processor 25 executing protocol analysis/selection block 124, identifies the application layer protocol associated with the request.

In an embodiment, the application layer protocol may be identified by port number. For example, interface 18 of security device 24 may be configured to accept connections on all its address on an IP port—(e.g. port 443), where the port identifies the HTTP protocol, with SSL enabled. An associated data extraction algorithm may cause device 24 to decode and encode HTTP communications, specifically processing HTML content. As another example interface 38 may be configured to accept TCP/IP connections on port 3306 for the purposes of processing MySQL database communications.

FIG. 4 depicts pseudo code 220 used to as part of protocol analysis component 124 to identify a specific application layer protocol, where the example code 220 identifies an HTTP connection. As will be appreciated, protocol analysis component 124 may further include code to identify other specific application layer protocols.

Code 220 defines the connection as using HTTP, such that all encoding and decoding services will process using the HTTP protocol. The transport layer is defined by specifying a plurality of listen instructions defining an address and port to allow connections to on interface 38. Code 220 further includes a service provider definition, where a plurality of service providers 50 are defined, as well as instructions on selection of service provider should multiple exist Once the application layer protocol has been identified in block S164 (FIG. 8), device 24 select one of a plurality of data extraction algorithms 122 at device 24 in block S165 in dependence on the identified application layer protocol.

The selected data extraction algorithm 122 may then decode payload data in the request message in block S167.

For example, if the connection transports an HTTP post message, then all of the data may be retrieved in order to support constructing the HTML DOM model to facilitate parameter replacement. In yet another example the connection is an upload of a binary document, where the data will be streamed in chunks of a previously defined size to limit memory requirements on the security device, where the binary document does not have any configured transformations or processing.

The decoded data may then be transformed by data transformation rules 121 in blocks S166 and S168, and tokenizing rules 123a in blocks S170 and S172.

More particularly, each of the transformation rules 121 may be sequentially applied to the payload of the message in blocks S166 and S168. The results of one transformation rule 121 may thus be passed to the next transformation rule 121, so that multiple transformation rules 121 have cumulative effect on the payload. For example, if a transformation has been configured to add a specific header as well as to rewrite a cookie value, then a modified message will be passed to the transformation to have the header added, and a modified message with additional header will then be passed to the cookie rewrite transformation.

The modified message resulting from transformation rules 121, will then be further modified by tokenization rules 123a.

In particular, selected payload data may be selected in accordance with the tokenizing rules 123a. For example, personal information (e.g. names, addresses); payment card information; or the like may be extracted from HTTP, SMTP, or similar messages. Once extracted, the data may be forwarded to data vaulting and tokenization server 36, which acts as a token encoder and stores the provided data to security device 24 in block S172 and returns at least one token used to identify and later retrieve the provided data, now stored at data vaulting and tokenization server 36. Once the token has been received from token encoder 26, security processing unit 25 may replace the selected data in the payload with the at least one token, also in block S172, to form modified payload. A modified message comprising the overhead and the payload data may be formed at unit 25 and forwarded to a downstream network node—such as server 50—in place of the intercepted message, in block S178.

As part of tokenization by security device 24, sensitive data may be removed from the payload data and replaced with substitute token values. For example an HTML page may be configured such that if the page name contains "accountinfo.html", and a field "CreditCardNo" exists, that this user-supplied secure value be removed from the data, and replaced with a substitute token value. As detailed below, the token value may be stored along with the sensitive data it replaces in an alternate data vaulting and tokenization server 36.

Prior to dispatching the modified message, it may be suitably encoded in block S176 so that server 50 can receive the modified message and process the request. The format of the original request may or may not match the encoding of the request in block S176 to be sent to server 50.

FIGS. 5A-5B depict pseudo code example transformation rules 121 and tokenization rules 123*a* for requests from computing device 14. Transformation rules 121 and tokenization rules 123*a* define a plurality of transformations that may be selectively invoked. For example, as depicted in the configuration example, transformation rules 121 are configured to add a series of HTTP headers indicating the original source of computing device 14, and to re-write any cookies in the request to update the host to be the host of the security device 24.

In order to provide modified messages to server 50, security processing unit 25 may initiate connections using interface 19 via network 6 to interface 19 on server 50 in order to access services provided by the service 51. The available connections to server 50 may be configured as part of the endpoint configuration of interface 18, such that they are a continuation of the same service. For example, if security device 24 is providing services for HTTP traffic, the connection to server 50 may (although not necessarily) also use HTTP.

Server 50 may then receive the modified message on a network connection from interface 18. Server 50, in turn, may perform processing by of software—creating, for example, service 51 (e.g. web server, database server, message queue).

Service 51 from the server 50 may or may not return data in a response to the request. The response will now be directed to security device 24. If the connection between server 50 and security device 24 has not been closed (e.g. timed-out) the response will also be processed by at device 24 by security processing unit 25 in accordance with data transformation rules 121 and data tokenization rules 123*b* to produce a modified response.

In a configuration, any substitute token data in the response may be replaced with either the original sensitive data or additional or alternate data and returned to computing device 14.

Figure 9A:
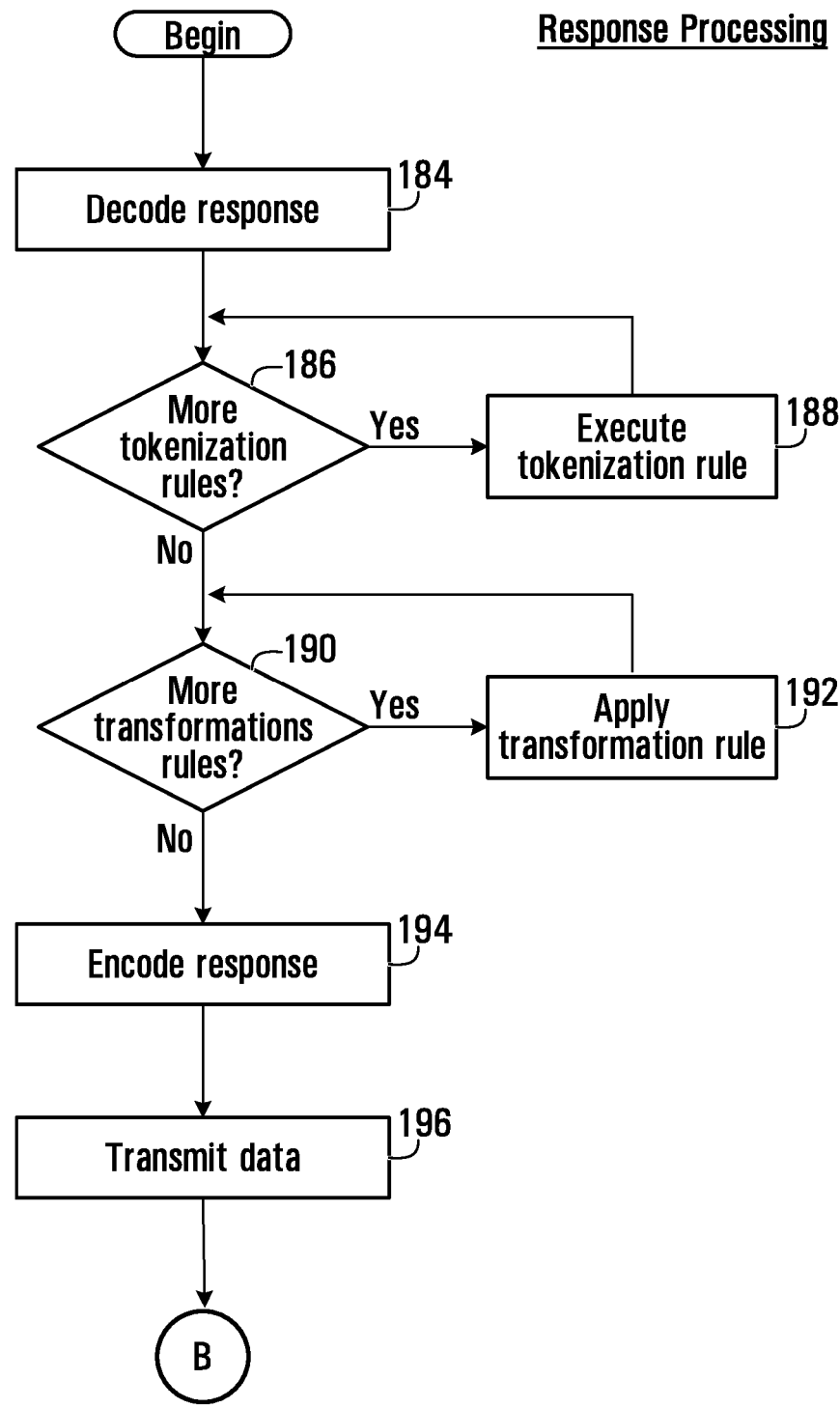
FIGS. 9A-9B are a flow chart of the handling of a response at the security device of FIG. 1.
Figure 9B:
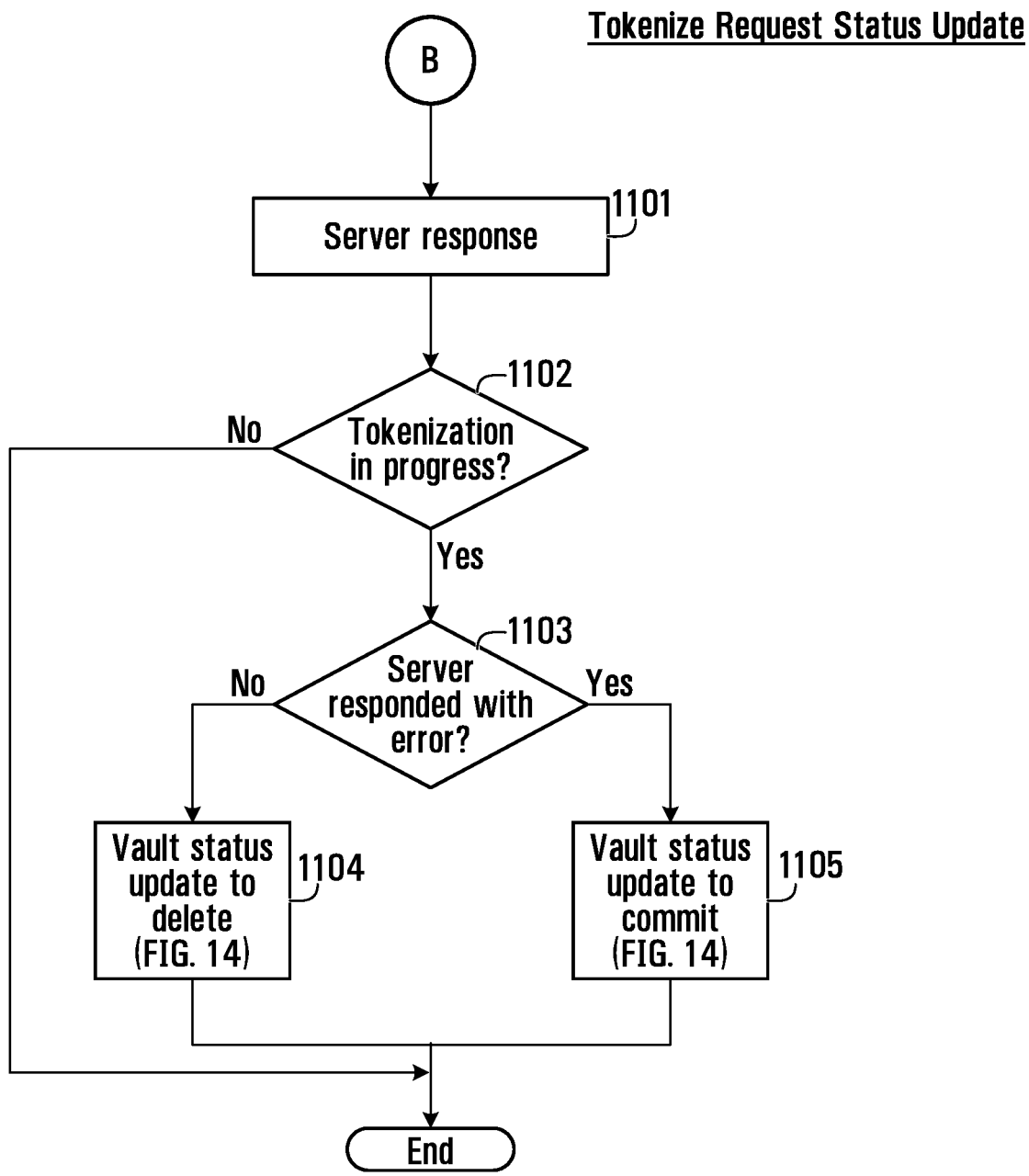

Steps performed at device 24 in processing a response are further exemplified in FIGS. 9A-9B.

As illustrated, upon receipt of the response by transport layer component 120, the response is decoded by a data extraction/replacement handler 122 for the application layer used by the response in block S184. Optionally, the relevant application layer protocol may be analyzed by block 124. Typically, however, the specific data extraction/replacement handler 122 may be chosen in dependence on the connection which was initially established by computing device 14. That is, context data associated with the request (and stored at security device 24) may be retrieved to be used processing the response processing.

Payload data in response PDUs may be received and decoded in S184 as required for transformation and de-tokenization. The payload data received may be some or all of the data in the response. For example, if the response is an HTML document the entire response payload data may be downloaded and processed. If, however, for example, the response is a binary document the response data may be only received in fragments and buffered at security device 24 as to reduce the memory requirements on the security device 24.

Decoded data in the response may then be transformed by applicable de-tokenizing rules 123*b* in blocks S186 and S188, and data transformation rules 121 in blocks S190 and S192, and.

In particular, selected payload data may be selected in accordance with the de-tokenizing rules 123*b*. For example, a token within the response payload may be provided to data vaulting and tokenization server 36, in return for data stored at data vaulting and tokenization server 36. The token within the response message may be replaced with the returned data, to form a modified response message. As will become apparent, the returned data may be sensitive data previously extracted from a request, or addition data stored in association with the token.

A modified message comprising the overhead and the payload data may be formed at unit 25 and forwarded to a downstream network node—such as server 50—in place of the intercepted message, in block S178.

FIGS. 6A-6B depict pseudo code exemplifying transformations rules 121 and de-tokenization rules 123*b* used in processing responses from server 50 at security device 24. Again, each of the rules may be selectively applied, in reliance on zero or more processing conditions applied to determine if and when it should be invoked. As depicted in the example, a transformation rule 121 rewrites the URL on any response data, such as HTML contents, javascript, styles, etc such that the value "someother.net" will be replaced with the host name.

Again, a plurality of de-tokenizing rules 123*b* may be applied to the response, and more particularly the payload data of the response. Each of the rules may rely on zero or more processing conditions applied to determine if and when it should be invoked.

For example, as depicted in the example configuration a de-tokenizing rule 123*b* may cause vaulted data to be saved when a tokenize request is in progress AND server 50 responded with a "200" OK response AND the URL does not contain the word "error", AND the response HTML body does not contain an HTML DIV element with the id "Error-Div".

Once the response message has been modified, the modified response message may be encoded at device 24 in block S194, and transmitted to computing device 14 in block S196. The response will typically be encoded into the format the format that the associated original request was received from computing device 14. This need not be the same format as the response received from the server 50.

The encoded response may be transmitted via interface 18, to computing device 14, where the process flow completes for the response.

As should now be appreciated, interposition of processing unit 25 in the connection between device 14 and server 50 allows payload data in communications between computing device 14 to be secured. Sensitive data is stored at data vaulting and tokenization server 36, and replaced in request messages with tokens. Tokens in response data may be replaced with sensitive data retrieved from data vaulting and tokenization server 36, or a proxy therefor (e.g. additional data). In this way, the message exchange between device 14 and server 50 over the established connection need not any provide any sensitive data to server 50.

For example, a credit card number being submitted from the computing device 14, via an HTML web page over HTTPS could be removed and replaced with a token substitute value 'X', where the server 50 would receive the value 'X' in place of the original data. This replacement can be reversed so that in a response received from server 50 the substitute token value 'X' can be replaced with the original value, so that an end user at device 14 is again presented with the original credit card number, or proxy therefore such as 'Y'. The process is transparent to both computing device 14 and the server 50: neither need be aware of the substitution having taken place.

Security processing unit 25 uses vault interface 26 to communicate with data vaulting and tokenization server 36 to, as noted, i) store a plurality of sensitive data elements and additional data and obtain a benign substitute (aka a "token"), or ii) provide in return for a token either the original sensitive data or additional data that can be used depending the parameters used in the call the vault interface. Tokenization, de-tokenizing and vaulting of data are further detailed in FIGS. 10 to 14.

Processing unit 25 may call data vaulting and tokenization server 36, by way of an application programmer interface (API) passing sensitive data—e.g. a credit card number, customer number, name, expiry date, etc—and additional data. The data vaulting and tokenization server 36 may return a token substitute that may have particular characteristics. For example, data vaulting and tokenization server 36 may generate and return a token that satisfies the Luhn validation checks for a credit card.

As such, system 10 may be configured to remove credit card numbers from user input, where the credit card is being supplied to support recurring billing, and the original system was designed to store these credit card numbers to apply these recurring charges.

Figure 10:
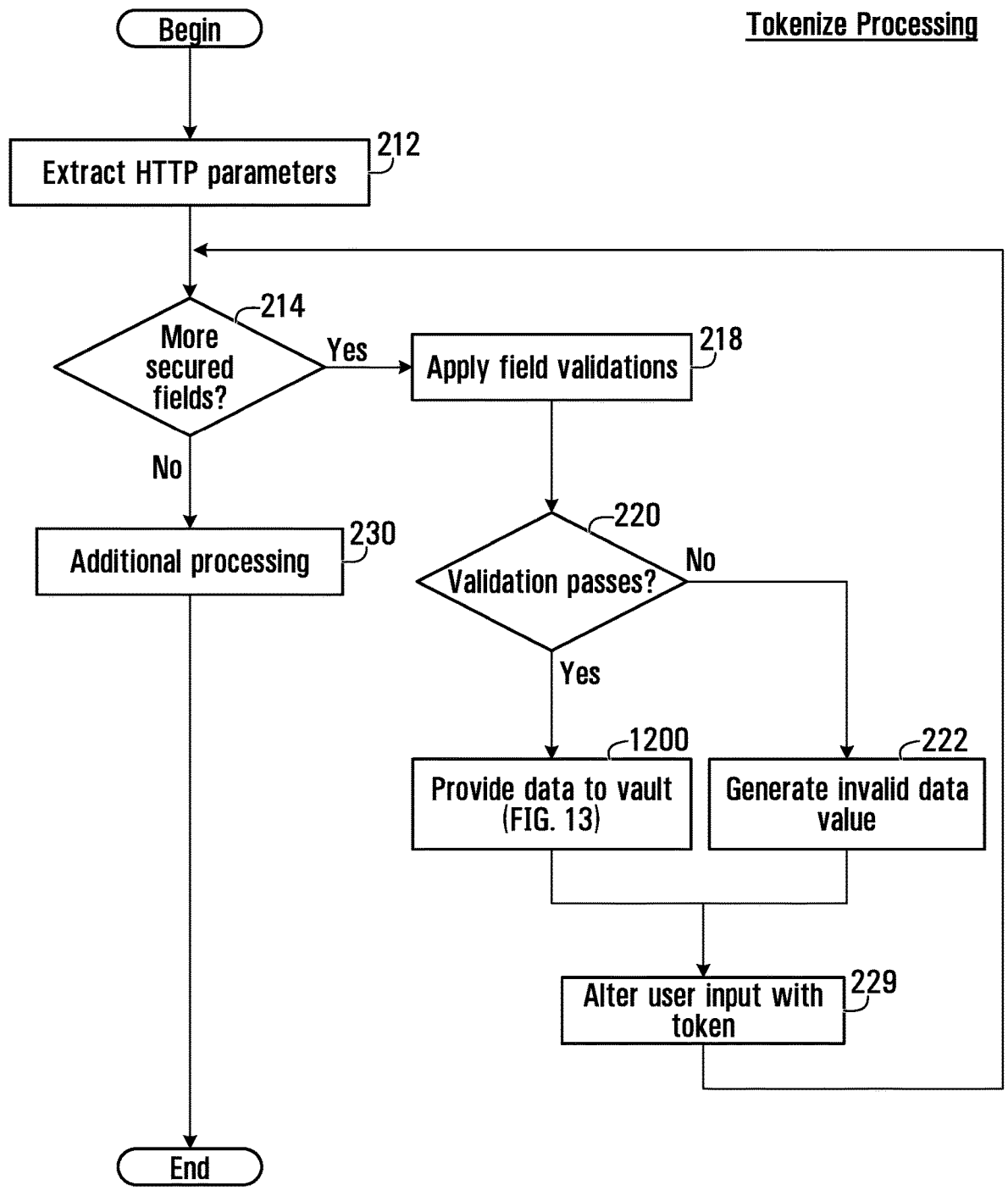
FIG. 10 is a flow chart illustrating tokenization at the security device of FIG. 1.

FIG. 10 depicts steps performed in tokenizing data within an HTML document, at security device 14. Tokenization may be performed in steps S170 and S172 (FIG. 8). As illustrated, the HTML document is parsed and analyzed to locate fields to be secured/tokenized in blocks S212 and S214. Each identified field may be validated in block S218 to ensure values meet defined criteria. For example, if the field to be tokenized represents a credit card number, it may be validated by way of a Luhn check, and by validating the first digit as a previously defined and allowed value. If validation passes, as determined in block S220, the value may be passed to vaulting and tokenization server 36 in block S1200. Vaulting and tokenization server 36 may return a token value, and temporarily store the passed value. If validation does not pass an invalid data value may be generated in block S222. The field in the HTML document to be tokenized may be modified by device 24 in block S229, by replacing the value contained in the original document/message with the token value returned by vaulting and tokenization server 36 in block S1200.

Additional processing to the HTML document may be performed in block S230.

Upon receipt of a successful response, as determined in block S234, device 24 may signal a commit message to vaulting and tokenization server 36. Vaulting and tokenization server 36, in turn, may commit storage of data provided from the message at vaulting and tokenization server 36 for later retrieval, in block S1300. Alternatively, discard message may be provided to vaulting and tokenization server 36, signaling that vaulting and tokenization server 36 should discard temporarily stored values in the message.

Figure 11:
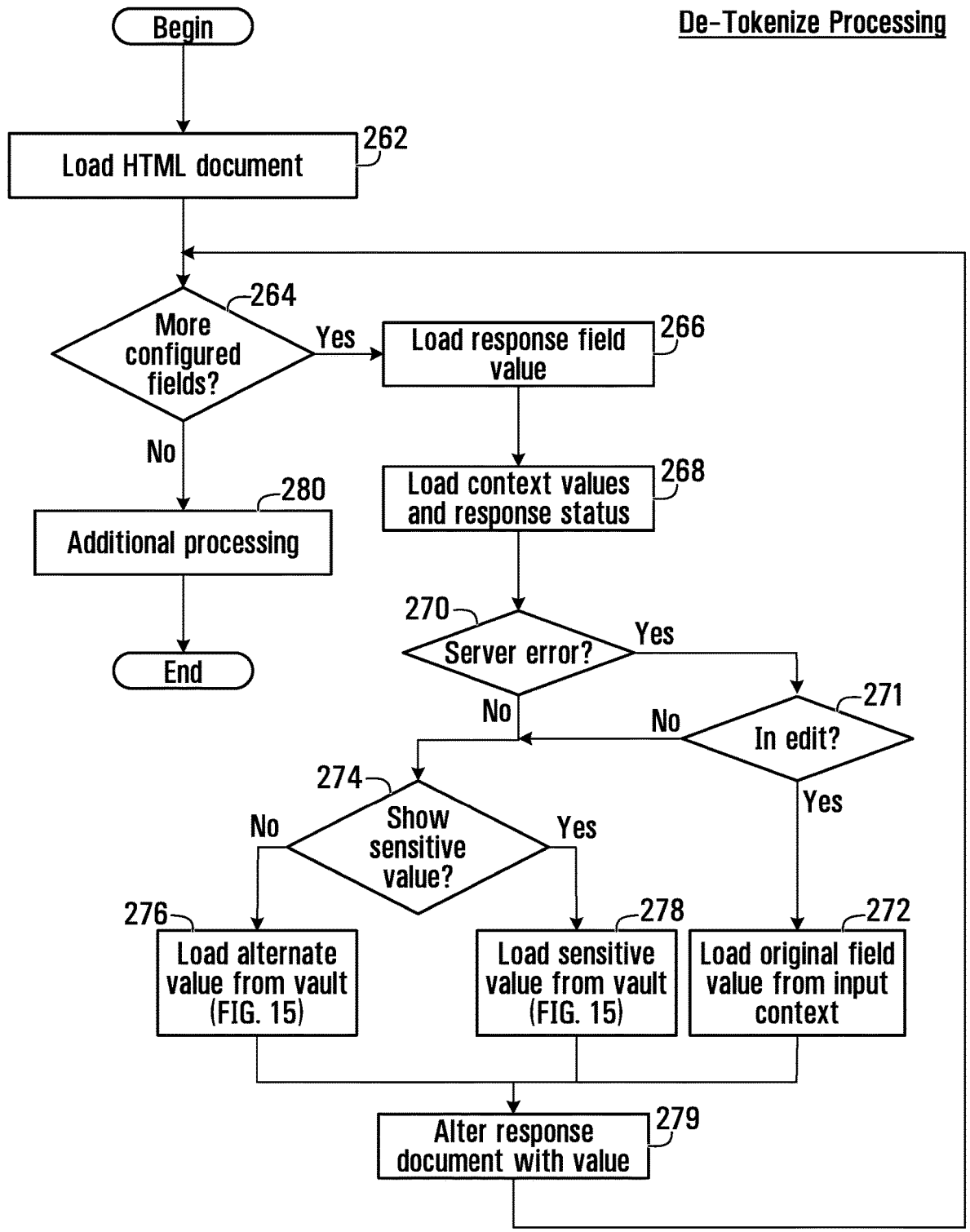
FIG. 11 is a flow chart illustrating tokenization at the security device of FIG. 1.

FIG. 11 depicts steps performed in de-tokenizing data within an HTML document, at security device 14, for example in blocks S186 and S188 of FIGS. 9A-9B. As illustrated, HTML document is loaded in block S262, and may also be parsed to identify tokens contained within the document. Identified tokens (as identified in blocks S264 and S266) may be used to retrieve associated data from vaulting and tokenization server 36 in block S278 or S276. If a token is to be replaced by its sensitive data, the sensitive data will be retrieved in block S278. If, on the other hand, the token is to be replaced by additional data stored by vaulting and tokenization server 36, then this data is retrieved in block S278. The retrieved data is used to replace the token in the HTML document in block S279. If the response is the result of server 50 returning an error message, as determined in block S270, field may be repopulated using context data stored at server 24, if available.

Figure 12:
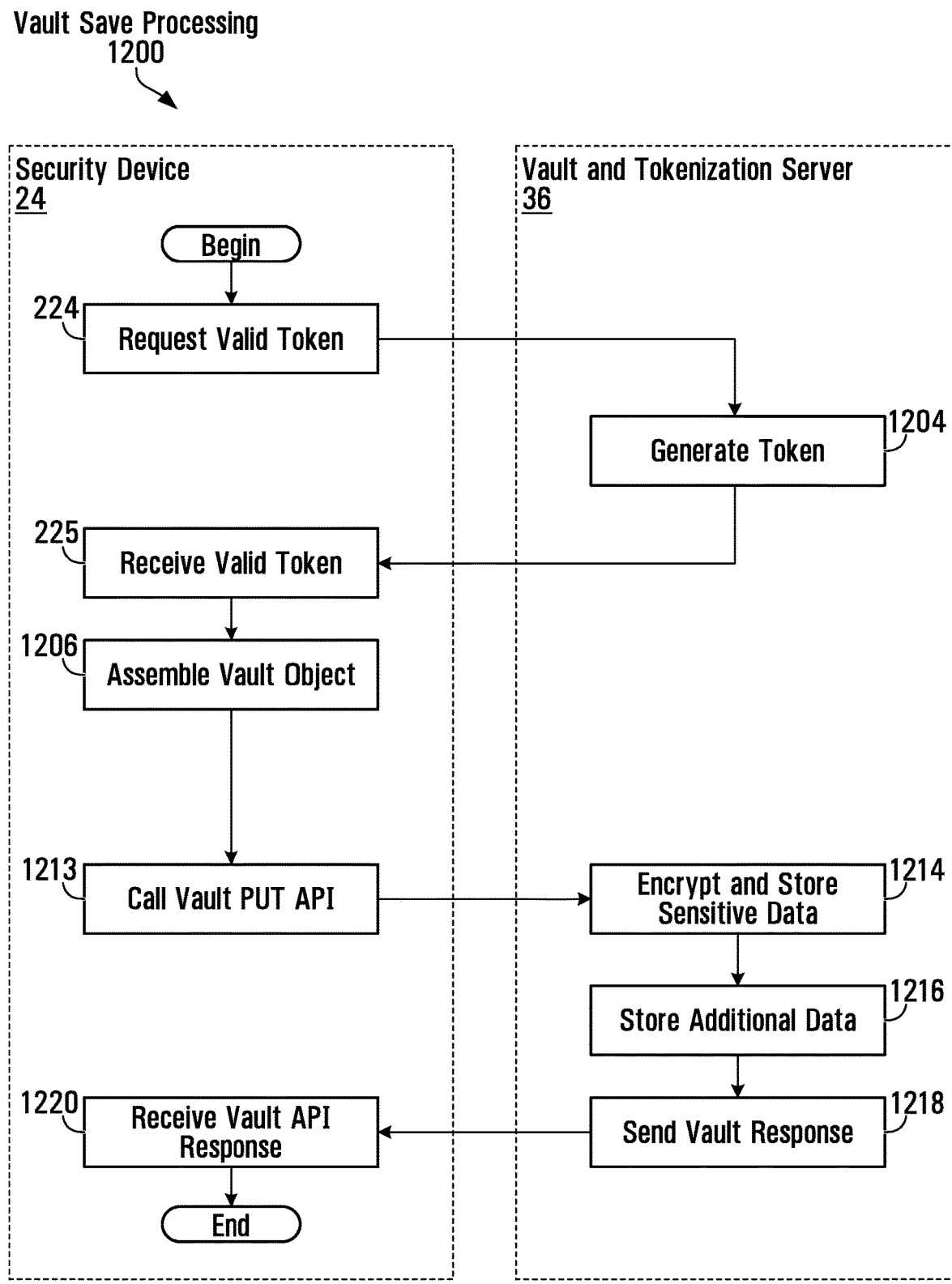
FIGS. 12-14 are flow charts illustrating data vaulting operation between the security device of FIG. 1, and a data vaulting and tokenization server of FIG. 1.

Data may be saved in vaulting and tokenization server 36, as illustrated in FIG. 12. As illustrated, in block S224 device 24 requests a token in block S224, by providing a suitable message to vaulting and tokenization server 36. Vaulting and tokenization server 36 may respond by providing the token in block S1204, which is received in block S225. In block S1206, data to be stored in association with the token may be assembled for provision to vaulting and tokenization server 36 in block S1213. Data to be stored may, for example, include sensitive data, additional data, and metadata. The provided data may at vaulting and tokenization server 36 in block S1214 and S1216, for storage in a data store at vaulting and tokenization server 36 after optional receipt of a commit message as describe below. It may also optionally be encrypted. In block S1218, vaulting and tokenization server 36 may provide a completion message to device 24 that is received in block S1220.

Figure 13:
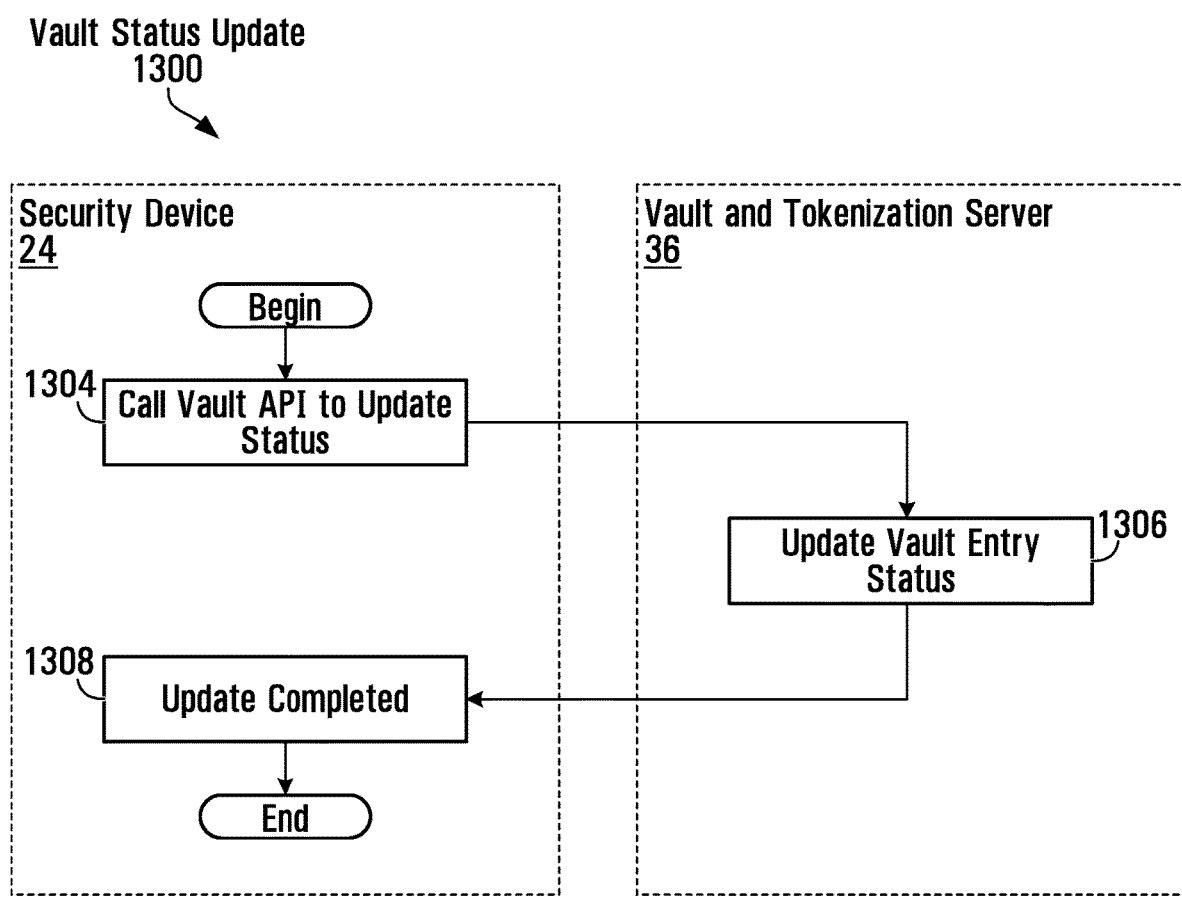

Data commit and delete may be initiated by device 24 as illustrated in FIG. 13, respectively. As illustrated, data commit or deletion of data previously provided to vaulting and tokenization server may be committed or deleted by server 24, by identifying the data/token and providing an appropriate message through an API call in block S1304 to vaulting and tokenization server 36. Vaulting and tokenization server 36, in response may commit or delete the token and associated data as identified in block S1306. As a result of the commit, the token and associated data may be persistently stored in a database at vaulting and tokenization server 36, for later retrieval and use. Likewise, as a result of a delete message, the token and associated data may be deleted from the data store at vaulting and tokenization server 36. Commit/delete may be acknowledged to security device 24 by vaulting and tokenization server 36. Acknowledgement may be received by security device 24 in block S1308.

Figure 14:
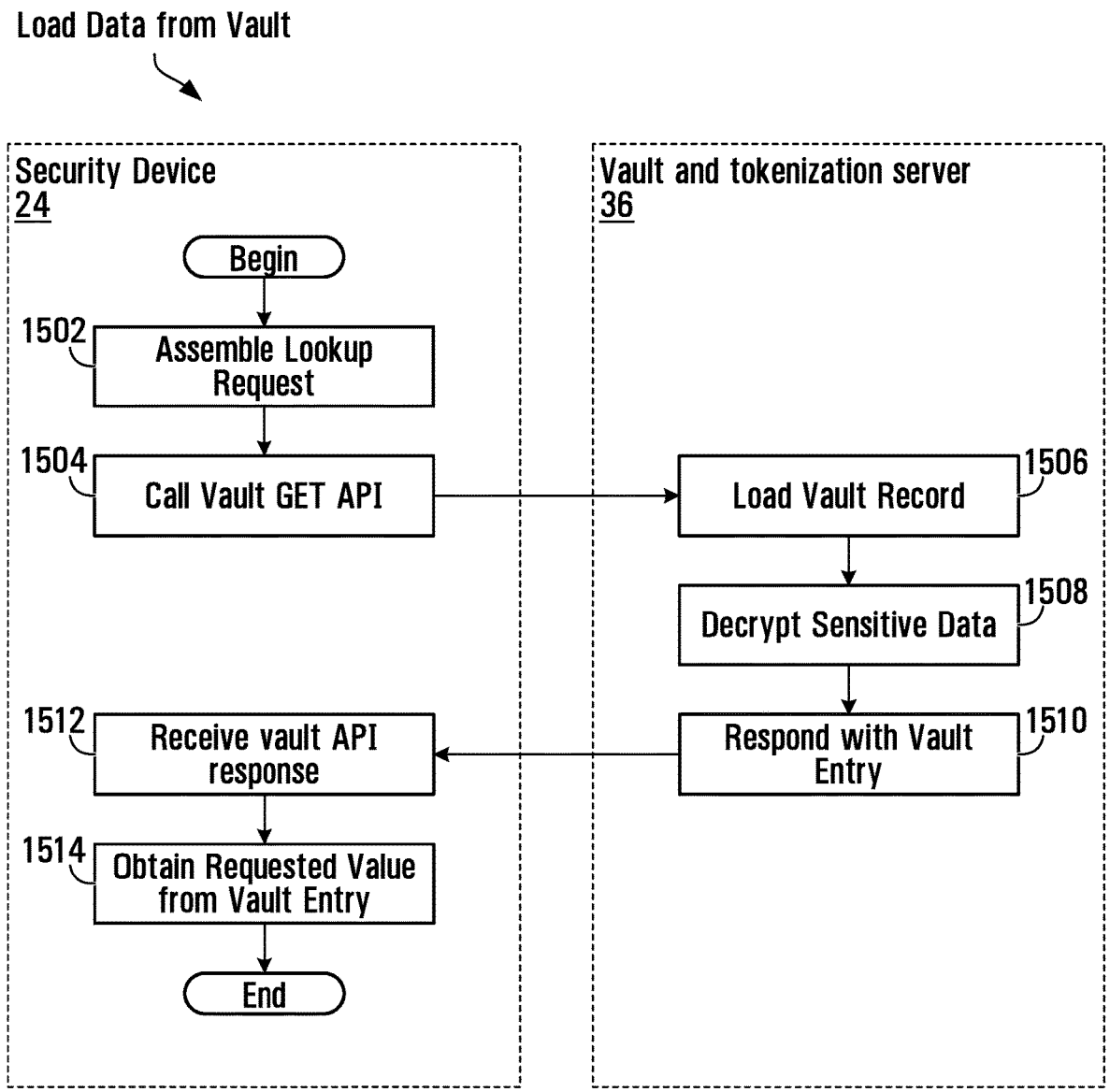

Data may be retrieved from vaulting and tokenization server 36 by security device 24, as illustrated in FIG. 14. As illustrated, in block S1502 an identified token may be extracted from payload data. The token in a suitable message may be provided to vaulting and tokenization server 36 in block S1504, by way of an API call. Vaulting and tokenization server 36 may respond by providing the associated data in block S1510, after optional decryption in block S1508. The data may be received at device 24 in block S1512, where desired data may be parsed in block S1514, and substituted for the provided token in the document.

Conveniently, device 24 allows system administrators to remove sensitive data from server 50, without any changes having been made to server 50, regardless of the location of server 50. Removal and replacement of sensitive data takes place at the outer most edges of the existing system boundaries, as close to the users and/or back end processes (i.e. payment card processes). Removal and further storage of sensitive data takes place in an alternate and specifically designed and vaulting and tokenization server 36. Configuration and subsequent install of device 24 may be simple and fast, and allows administrators to quickly and easily adhere with regulatory and best practices for security of data with little risk or cost.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A method of operating a network security device comprising at least one processor, said method comprising at said security device;
    intercepting a plurality of data units carrying traffic in a message encoded in accordance with an application layer protocol and having a destination address different from said security device, said message comprising payload;
    analyzing using said at least one processor said plurality of data units to identify the application layer protocol in accordance with which said message is encoded;
    selecting using said at least one processor a data extraction algorithm in dependence on the identified application layer protocol in accordance with which said message is encoded;
    extracting using said at least one processor selected data from said payload, in accordance with one or more rules;
    forwarding said selected data to an encoder, to allow said encoder to store said selected data and return at least one substitute used to identify said selected data;
    receiving from said encoder, said at least one substitute;
    replacing using said at least one processor said selected data in said payload with said at least one substitute to form modified payload;
    forming using said at least one processor a modified message comprising said modified payload in at least one modified data unit, said at least one modified data unit further including said destination address;
    forwarding said modified message with said destination address to a downstream network node, in place of said message.

2. A method of operating a network interconnected security device interposed between a computing device and a server, said network interconnected security device comprising at least one processor, said method comprising, at said security device:
    intercepting a request message to be exchanged between said computing device and said server, said request message comprising request payload data, and an address of said server;
    applying using said at least one processor, rules to said request payload data to extract sensitive data from said request message and forward said sensitive data to an encoder, to allow said encoder to store said sensitive data and return at least one substitute used to identify said sensitive data;
    receiving from said encoder said at least one substitute;
    replacing using said at least one processor, said sensitive data in said payload of said request message with said at least one token to form modified payload;
    forming using said processor, a modified message comprising said payload as modified, and said address of said server;
    providing said modified request message to said server;
    receiving from said server a response message, said response message provided by said server in response to said modified request message, and comprising response payload data and a network address of said computing device;
    applying using said at least one processor rules to payload data of said response message to identify at least one substitute within said response message;
    retrieving from said encoder data stored in association with said at least one substitute in said response message;
    replacing using said at least one processor said at least one substitute in said response payload data with said data as retrieved;
    forming using said at least one processor a modified response message comprising said response message payload as modified, and said network address of said computing device;
    providing said modified response message to said computing device.

3. The method of claim 2, wherein said request message and response message are HTML messages.

4. The method of claim 2, further comprising forwarding additional data associated with said sensitive data to said encoder for storage.

5. The method of claim 3, wherein said additional data comprises a partially obfuscated version of said sensitive data.

6. The method of claim 2, wherein said sensitive data comprises a credit card number.

7. The method of claim 2, wherein said at least one token is a numeric token that satisfies the Luhn formula.

8. A non-transitory computer readable medium storing computer executable instructions adapting a computing device to perform the method of claim 1.

9. Computing device comprising a computing core under program control to be operable to perform the method of claim 1.

10. The method of claim 1, wherein said security device comprises one of a router and a network proxy.

11. The method of claim 2, wherein said security device comprises one of a router and a network proxy.

12. The method of claim 2, further comprising retrieving context data associated with the request message to process the response message.

\* \* \* \* \*